Sept. 18, 1962 J. LIPSHUTZ 3,054,976
DIFFERENTIAL TRANSFORMER
Filed Nov. 18, 1958 2 Sheets-Sheet 1

INVENTOR.
JOSEPH LIPSHUTZ
BY
Edward M. Farrell
ATTORNEY

Sept. 18, 1962  J. LIPSHUTZ  3,054,976
DIFFERENTIAL TRANSFORMER
Filed Nov. 18, 1958  2 Sheets-Sheet 2
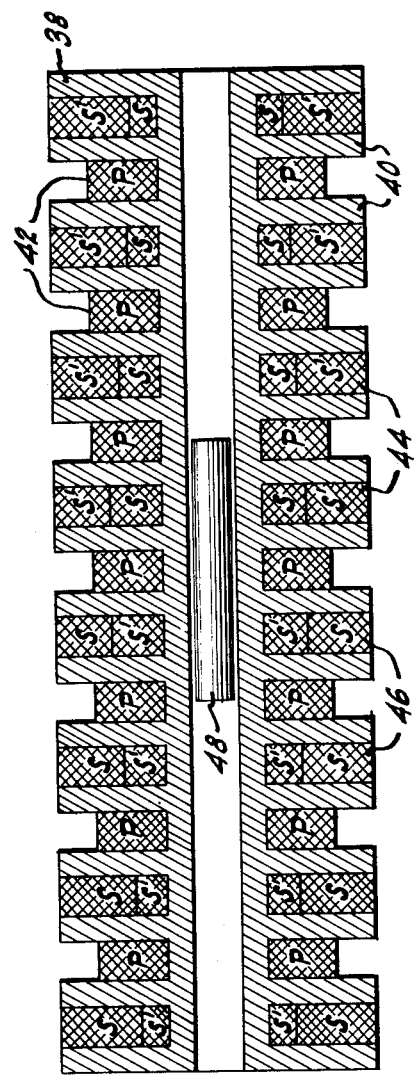
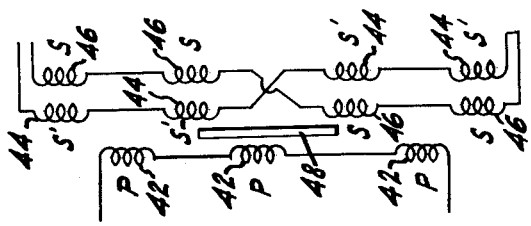
INVENTOR.
JOSEPH LIPSHUTZ
BY
*Edward M. Farrell*
ATTORNEY United States Patent Office 3,054,976
Patented Sept. 18, 1962

1

3,054,976
DIFFERENTIAL TRANSFORMER
Joseph Lipshutz, Philadelphia, Pa., assignor to Schaevitz Engineering, a corporation of New Jersey
Filed Nov. 18, 1958, Ser. No. 774,702
8 Claims. (Cl. 336—136)

This invention relates to differential transformers, and more particularly to differential transformers having a wide linear range of operation.

A differential transformer is utilized in a large number of measuring and controlling systems. For example, it is useful in systems involving accelerometers, fluid pressure gages, strain measurement devices, telemetering and other dynamic and static indicating, operating and controlling devices in any situation where the magnitude of a displacement of any type is to be measured. Such a differential transformer normally has a linear output characteristic with respect to an input measurement. The differential transformer has been used extensively for producing an electrical output signal proportional to the displacement of a body. For example, the differential transformer generally includes a movable core member adapted to be moved in accordance with a measured function. The movable core member is generally disposed within the primary and secondary windings of the transformer and provides a path for the magnetic flux linking the windings. The secondary of the transformer generally includes a pair of substantially similar windings connected in opposition or bucking relationship.

When the primary winding of the transformer is energized with alternating current, voltages are induced in the two secondary windings. Since the two secondary windings are connected in opposition, the induced voltages are opposite in phase. Therefore, the net output voltage from the transformer is the difference between the voltages induced in the two secondary windings. For one position of the core member, equal voltages are induced in the two secondary windings resulting in a net zero output voltage. When the core is positioned for zero output volts, the core is said to be at the balance point or null position.

When the core member is moved from its null position, the voltage induced in the secondary winding towards which the core is moved increases, while the voltage induced in the secondary winding from which the core is moved decreases. These variations in induced voltages are due to the variations in the magnetic flux path between the primary winding and the respective secondary windings, caused by the relative movement of the core member. When the core member is thus moved from its null position, a differential output voltage across the output circuit of the transformer results. With proper design, the output voltage from the transformer varies linearly with a change in the core position as long as the core is operating within its linear range. Motion of the core in the opposite direction beyond the null position produces a similar voltage characteristic across the output circuit of the transformer, but with the phase shifted 180 degrees. The overall core travel for linear operation in such transformers is less than one half the total lengths involved.

While such differential transformers have proven satisfactory in many cases, it is sometimes necessary to

2 measure functions which require a relatively long core stroke greater than one half the total length of the transformer while still staying within the linear operating range. In order to utilize the maximum length of core travel in these cases, the core must generally be short enough so that neither one of its ends will be moved beyond the ends of the primary winding and must be long enough so that neither of its ends will be moved past the inner ends of either one of the secondary windings. The use of a relatively large core in these cases limits the range of core movement since the core will tend to move outside the magnetic coupling paths of the transformer windings. The use of a small core in differential transformers used heretofore has resulted in a limited linear range of core movement since the core tended to move out of the range or magnetic coupling path of one of the secondary windings.

It is an object of this invention to provide an improved differential transformer which provides a linear output signal for relatively wide ranges of core movement.

It is a further object of this invention to provide an improved differential transformer which provides a linear output signal for relatively wide ranges of core movement wherein the core is physically centered to provide a zero output signal.

It is still a further object of this invention to provide an improved differential transformer which provides a linear output signal for relatively wide ranges of core movement in which the winding of the coils is facilitated.

It is still a further object of this invention to provide an improved differential transformer in which the distributed capacitance between windings is minimized.

It is still a further object of this invention to provide an improved differential transformer in which the length of core travel for linear operation is greater than one half the length of the transformer.

It is still a further object of this invention to provide an improved differential transformer which provides a linear output signal for relatively wide ranges of core movement without increasing the size over many conventional types of differential transformers used heretofore.

In accordance with the present invention, a differential transformer is provide having a primary winding and a pair of secondary windings connected in opposition. A core is disposed within the windings and is adapted to be moved to vary the combined output signal from the two secondary windings in accordance with the degree of movement of the core. The pair of secondary windings are wound in a tapered form, are disposed in a complementary relationship to each other and coextensively disposed with respect to each other. The core is small relative to the length of the windings and a linear output signal is attained when it is moved over a wide range within the windings.

Other objects and advantages of the present invention will be apparent and suggest themselves to those skilled in the art to which the present invention is related, from a reading of the following specification and claims in conjunction with the accompanying drawing, in which:

FIGURE 5 represents a cross sectional view of still another embodiment of a differential transformer, in accordance with the present invention, and FIGURE 6 is a schematic diagram of a differential transformer of a type illustrated in FIGURE 5.

Figure 1:
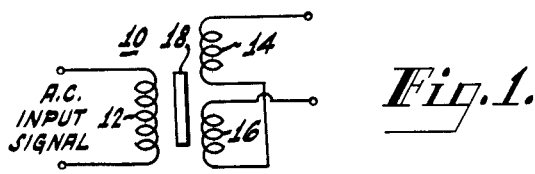
FIGURE 1 is a schematic diagram of a differential transformer of the conventional type.

Referring particularly to FIGURE 1, a differential transformer 10 of the conventional type includes a primary winding 12 and a pair of secondary windings 14 and 16 connected in opposition. A core 18 is disposed within the windings and is adapted to be moved in accordance with a measured function. The primary winding 12 is energized by a source of alternating current to induce oppositely phased voltages in the two secondary windings 14 and 16. When the core 18 is centered, a substantially zero output voltage is obtained across the output terminals of the two secondary windings. When the core is moved from its center position, the phase of the output voltage developed is dependent upon the direction of the core movement.

Figure 2:
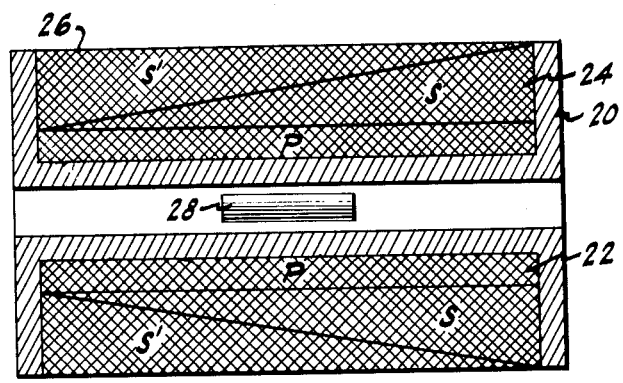
FIGURE 2 represents a longitudinal cross sectional view of a physical embodiment of a differential transformer, in accordance with the present invention.

Referring particularly to FIGURE 2, a physical embodiment of one form of the present invention includes a differential transformer having a hollow insulated cylindrical coil form 20. A primary winding 22 (also designated P) is disposed along the entire length within the coil form. A first secondary winding 24 (also designated S) is disposed coextensively with the primary winding 22 with the number of turns in the winding 24 becoming progressively greater as it extends from one end to the opposite end of the coil form. A secondary winding 26 (also designated S') is also disposed in coextensive relationship with the primary winding 22 and with the secondary winding 24. The secondary winding 26 may be considered complementary to the secondary winding 24 with the ratio of its number of turns decreasing proportionately as the number of turns in the secondary winding 24 increases. The tapering effects of the secondary windings 24 and 26 in opposite directions result in a substantially equal number of total turns throughout the entire length of the coil form 20.

A core 28 is disposed within the primary and secondary windings within the coil form 20 to provide a magnetic coupling path therebetween. The electrical connections of the primary and secondary windings may be similar to that illustrated and described in connection with FIGURE 1. Movement of the core 28 in an axial direction within the coil form 20 results in a differential output voltage from the two secondary windings.

It was pointed out that one of the disadvantages of a small core in most types of conventional differential transformers was that the permissible core stroke for linear operation was limited since the core tended to move out of the range or magnetic coupling path of either one of the secondary windings. The tapered secondary windings coextensively disposed with respect to each other in the manner shown avoids this limitation. The core 28 may be axially moved throughout the entire length of the coil form 20 while still providing a magnetic coupling path between the primary and both secondary windings.

In the embodiment illustrated in FIGURE 2, it is noted that the core 28 is physically closer to the secondary winding 24 than to the secondary winding 26. This results in a greater magnetic coupling between the primary winding 22 and the secondary winding 24 than between the primary winding 22 and the secondary winding 26 when the core 28 is physically centered. Thus, under these conditions, the null point or zero operating position of the core 28 will be off from the center of the coil form. In order to overcome this disadvantage as well as producing other desired advantages, the arrangement illustrated in FIGURE 3 may be employed.

Figure 3:
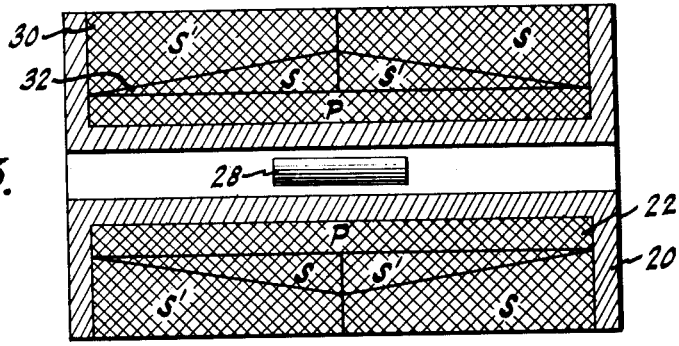
FIGURE 3 represents a cross sectional view of another physical embodiment of a differential transformer, in accordance with the present invention.

Referring particularly to FIGURE 3, the coil form 20, the primary winding 22 and the core 28 are disposed in a manner similar to that shown in FIGURE 2. A secondary winding 30 (also designated S'), disposed away from the center of the coil form 20, has a maximum number of turns at one end of the coil form 20 with its number of turns gradually decreasing until it reaches the center of the coil form. At the center of the coil form, the secondary winding 30 is disposed towards the center of the coil form and continues to decrease until it reaches a minimum number of turns at the opposite end of the coil form. A secondary winding (also designated S) is disposed in complementary relationship to the secondary winding 30 and is disposed towards the center of the coil form at one end. The number of turns in the winding 30 increases from a minimum number of turns at one end of the coil form and gradually increases as it approaches the center of the coil form. At the center of the coil form, the position of the winding 32 is disposed away from the center of the coil form with its number of turns in the winding continuing to increase until it reaches a maximum number at the opposite end of the coil form. The number of turns of one secondary winding varies inversely with the number of turns in the other secondary winding throughout the length of the coil form thereby providing that the total number of turns in both secondary windings are substantially the same throughout the entire length of the coil form.

It is seen that one half of the secondary winding 30 is disposed further away from the axial center of the coil form 20 than its complementary coextensive half of the secondary winding 32. Likewise, the other half of the secondary winding 30 is disposed closer to the axial center of the coil form than its complementary coextensive half of the secondary winding 32.

One advantage of the embodiment illustrated in FIGURE 3 over the embodiment illustrated in FIGURE 2 is that the degree of coupling between the primary winding 22 and the pair of secondary windings 30 and 32 is substantially the same when the core 28 is physically centered with the coil form 20 thereby providing zero output signal from the differential transformer at this point. This condition is due primarily because the two secondary windings are equally spaced from the primary winding 22 and the core 28. The core 28 may be axially moved through substantially the entire length of the coil form 20 without moving outside the range of magnetic coupling path of either of the secondary windings 30 and 32, thereby providing the same advantages of tapered complementary coextensive secondary windings as the embodiment shown and described in connection with FIGURE 2.

Figure 4:
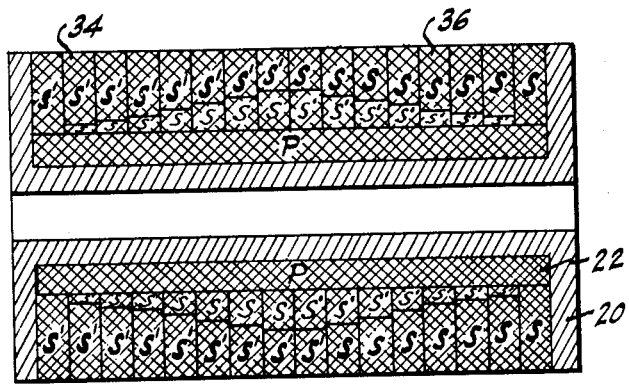
FIGURE 4 represents a cross sectional view of still another differential transformer, in accordance with the present invention.

Referring particularly to FIGURE 4, an arrangement is illustrated in which the number of turns in the windings of a differential transformer involving tapered windings may be calculated and wound quickly and efficiently. In this embodiment, a pair of secondary windings 34 and 36 (also designated S' and S, respectively), are wound to correspond generally to the tapered forms of the secondary windings 30 and 32, respectively, illustrated in FIGURE 3. The number of turns in the secondary winding 34 is maximum at one end, disposed away from the axial center of the coil form 20 and and progressively decreases until it reaches the middle of the coil form. At the middle or center of the coil form, the position of the secondary winding 34 is close to the axial center of the coil form with the number of turns in the secondary winding 34 continuing to decrease as it extends towards the opposite end of the coil form. Conversely, the secondary winding 36 has a minimum number of turns at one end of the coil form with the number of turns gradually increasing as it extends towards the center of the coil form. At the center of the coil form, the number of turns of the secondary winding 36 continues to increase to a maximum number of turns as it extends towards the opposite end of the coil form. Like the secondary winding 34, the positions of the secondary winding 36 are shifted relative to the axial center of the coil form when the center of the coil form is reached.

The secondary windings 34 and 36 are in a stepped relationship with each other to facilitate the winding of the coils involved while still attaining substantially the same advantages of the tapered complementary coextensive windings discussed in connection with FIGURES 2 and 3. Again, the electrical connections of the embodiment illustrated in FIGURE 4 may be similar to those shown and described in connection with FIGURE 1.

Referring particularly to FIGURE 5, an arrangement is illustrated in which excessive flux leakage and excessive capacity between windings in a differential transformer are minimized. This is attained through the use of multiple coils in the primary and secondary windings to provide a more equal distribution of the primary winding magnetic flux and a decrease in the inter winding capacity.

The differential transformer illustrated in FIGURE 5 includes a hollow cylindrical coil form 38 having a plurality of radially extending fins or ribs 40. The ribs 40 are equally spaced to provide annular grooves designed to receive coils. For purposes of explanation only, the term coil will be considered a portion of a complete winding which may be physically separated but not necessarily disconnected electrically. Coils 42 of a primary winding designated P are disposed within alternate grooves of the coil form 38. A secondary winding designated S' comprises a plurality of coils 44 disposed in the alternate grooves between the coils 42 of the primary winding P. A secondary winding designated as S also comprises a plurality of coils 46 disposed within the same alternate grooves as the coils 44.

The secondary windings are stepped to provide a form of tapering effect described in connection with FIGURE 4. The mode of operation for the embodiments shown in FIGURES 4 and 5 is substantially the same with the embodiment of FIGURE 5 offering an additional advantage of minimizing interwinding capacity to improve the linear operating range of the transformer. A zero output signal is obtained when the core 48 is physically centered within the coil form 38.

Referring particularly to FIGURE 6, there is shown a schematic diagram of the embodiment illustrated in FIGURE 5.

While various modifications of the present invention have been illustrated, it is realized that various other modifications and different winding configurations will be readily apparent to those skilled in the art of differential transformers.

What is claimed is:

1. A differential transformer comprising a primary winding disposed about an axis, a pair of secondary windings connected in opposition concentrically disposed about said axis, said secondary windings being in a complementary coextensive tapered relationship to each other and being disposed in the same planar relationship at right angles to the direction of said axis, means for applying an alternating signal to said primary winding, and a core disposed within said secondary windings adapted to be moved axially along substantially the entire length of both said secondary windings to produce a substantially linear output signal corresponding to the motion of said core throughout the entire range of movement thereof.

2. A differential transformer comprising an elongated hollow cylindrical insulated coil form, a primary winding disposed along its entire length on said coil form about an axis, a pair of secondary windings connected in opposition both disposed along substantially the entire length of said coil form, said secondary windings being concentrically disposed about said axis in a complementary coextensive tapered relationship to each other and being disposed in the same planar relationship at right angles to the direction of said axis, means for applying an alternating signal to said primary winding, and a core disposed within said coil form adapted to be moved axially along substantially the entire length of both said secondary windings to produce a substantially linear output signal corresponding to the direction and degree of motion of said core.

3. A differential transformer comprising an elongated hollow cylindrical insulated coil form disposed about a central axis, a primary winding disposed on said coil form, a pair of secondary windings connected in opposition both concentrically disposed about said axis along substantially the entire length of said coil form, said secondary windings being in a complementary coextensive tapered relationship to each other and being disposed in the same planar relationship at right angles to the direction of said axis, one half of each secondary winding being disposed in relatively close relationship to said coil form with its other half being disposed away from said coil form, means for applying an alternating signal to said primary winding, and a core disposed within said coil form adapted to be moved axially along substantially the entire length of said secondary windings to produce a substantially linear output signal for substantially the entire range of movement of said core.

4. A differential transformer comprising an elongated hollow cylindrical insulated coil form disposed about a central axis and having a plurality of ribs forming annular grooves, a primary winding including a plurality of coils disposed within some of the annular grooves of said coil form along substantially the entire length thereof, a pair of secondary windings connected in opposition disposed along substantially the entire length of said coil form, each of said secondary windings including a plurality of coils disposed within some of the annular grooves of said coil form, said secondary windings being in a complementary coextensive tapered relationship to each other and being disposed in the same planar relationship at right angles to the direction of said axis, means for applying an alternating signal to said primary winding, and a core disposed within said coil form adapted to be moved axially along substantially the entire length of said secondary windings to produce a substantially linear output signal for substantially the entire range of movement of said core.

5. A differential transformer comprising an elongated hollow cylindrical insulated coil form disposed about a central axis and having a plurality of ribs forming annular grooves, a primary winding including a plurality of coils disposed within some of the annular grooves of said coil form along substantially the entire length thereof, a pair of secondary windings connected in opposition disposed along substantially the entire length of said coil form, each of said secondary windings including a plurality of coils disposed within some of the annular grooves of said coil form, said secondary windings being in a complementary coextensive tapered relationship to each other and being disposed in the same planar relationship at right angles to the direction of said axis, the coils of one half of each secondary winding being disposed in relatively close relationship to said coil form with the coils of the other half being disposed away from said coil form, means for applying an alternating signal to said primary winding, and a core disposed within said coil form adapted to be moved axially along substantially the entire length of said secondary windings to produce a substantially linear output signal for substantially the entire range of movement of said core.

6. A differential transformer as set forth in claim 5 wherein the tapered relationship of said secondary windings is achieved by progressively increasing the number of turns in the coils within the grooves of said coil form.

7. A differential transformer as set forth in claim 6 wherein said plurality of coils of said primary winding are disposed within alternate grooves of said coil form and said plurality of coils of said secondary windings are disposed in the alternate grooves between said plurality of coils of said primary winding.

8. A differential transformer as set forth in claim 7 wherein the total number of turns of the coils in all the grooves including said secondary windings is substantially the same.

References Cited in the file of this patent

UNITED STATES PATENTS

| | | |
|---|---|---|
| 1,671,106 | Fisher | May 29, 1928 |
| 2,424,766 | Miner | July 29, 1947 |
| 2,507,344 | MacGeorge | May 9, 1950 |
| 2,564,221 | Hornfeck | Aug. 14, 1951 |
| 2,911,632 | Levine | Nov. 3, 1959 |

FOREIGN PATENTS

| | | |
|---|---|---|
| 123,012 | Sweden | Oct. 12, 1948 |